(12) United States Patent
Naor

(10) Patent No.: US 6,340,248 B1
(45) Date of Patent: Jan. 22, 2002

(54) HIGH PRECISION OPTICAL COLLIMATOR FOR OPTICAL WAVEGUIDE

(75) Inventor: Isaac Naor, Hod Hasharon (IL)

(73) Assignee: Lasercomm Inc., Plano, TX (US)

( * ) Notice: Subject to any disclaimer, the term of this patent is extended or adjusted under 35 U.S.C. 154(b) by 0 days.

(21) Appl. No.: 09/613,858

(22) Filed: Jul. 11, 2000

Related U.S. Application Data

(60) Provisional application No. 60/189,395, filed on Mar. 15, 2000.

(51) Int. Cl.[7] .................................................. G02B 6/36
(52) U.S. Cl. ............................ 385/79; 385/52; 385/78; 385/84
(58) Field of Search ............................. 385/31, 33, 49, 385/52–94, 139

(56) References Cited

U.S. PATENT DOCUMENTS

| | | | | |
|---|---|---|---|---|
| 4,596,406 A | * | 6/1986 | Van Vleet et al. | 280/511 |
| 5,148,322 A | | 9/1992 | Aoyama et al. | 359/708 |
| 5,347,605 A | * | 9/1994 | Isaksson | 385/92 |
| 5,898,805 A | | 4/1999 | Kanazawa et al. | 385/38 |
| 5,963,684 A | | 10/1999 | Ford et al. | 385/24 |

* cited by examiner

*Primary Examiner*—Akm E. Ullah
*Assistant Examiner*—Michelle R. Connelly-Cushwa
(74) *Attorney, Agent, or Firm*—Kahn, Simon Mark

(57) ABSTRACT

The present invention relates to a method for enabling reliable, consistent alignment of a beam of light eating the end of an optical fiber, which has been cut at a non-perpendicular angle, with a collimating lens. The method involves utilizing a spherical shape to generate two bores in the object which intersect the center at a predetermined angle. The predetermined angle is equivalent to the angle of the light beam exiting the end of the optical fiber.

20 Claims, 6 Drawing Sheets

HIGH PRECISION OPTICAL COLLIMATOR FOR OPTICAL WAVEGUIDE

RELATED APPLICATION

This application claims the benefit of the filing date of copending U.S. Provisional Application, Ser. No. 60/189,395 filed Mar. 15, 2000, entitled "High Precision Optical Collimator for Optical Waveguide," the entirety of which provisional application is incorporated by reference herein.

FIELD OF THE INVENTION

The invention relates generally to optical communication systems and, more specifically, to optical collimators used in optical communication systems.

BACKGROUND OF THE INVENTION

Optical communication systems use collimating lenses to transfer light from optical waveguides or fibers to other optical elements. Typically, light exiting an optical fiber will rapidly diverge. In order to efficiently transmit the optical signal, it is desirable to capture as much of the diverging light as possible. Collimating the exiting light beam is one method to accomplish this. Collimating the light beam involves positioning a collimating lens to receive the optical signal in such a way that substantially parallel light exits the collimating lens. Ideally the end of the fiber should be cut at right angles to its axis so that the light exiting the fiber will be parallel to its axis. However, one major difficulty with this technique is that portions of the optical signal will be reflected by the end surface of the cut fiber and propagated in a reverse direction through the optical fiber. This is an undesirable condition known as back reflection. One way to minimize back reflections is to cut the end of the optical fiber at an angle so that reflected light is not guided in the fiber. In this way, much of the reflected light will be lost and not returned through the optical fiber.

One way to minimize back reflection is shown in FIG. 1, where the end of an optical fiber 10 contained within ferrule 20 is polished at the standard Angular Physical Contact (APC) angle of 8°. As a result, a principle light beam coming out of the end of the fiber deviates from the fiber axis. The resultant angle of the light beam exiting the fiber can be shown, using Snell's law, to be approximately 3.62° (shown as angle 26) for a typical communication fiber. To properly align fiber 10 to a collimating lens 12, a ferrule 20 containing the fiber 10 is inserted into a collimator housing 22 and the angle 26 of the ferrule 20 to the axis 24 should be 3.62° to ensure that the light exiting the fiber along the axis 24 is coincident with the axis 13 of the collimating lens 12.

Although the axis of the fiber 10 is aligned to the axis of the ferrule 20, it is difficult to reliably and consistently align the ferrule 20 to the housing 22 at the correct angle and in the correct location. Any misalignment will result in degraded collimation. In the event that the end of the fiber 10 is misaligned, for example if it is located at point 25 instead of point 23, or if its actual angle 26 does not accurately compensate for the angle of the light beam exiting the fiber 10, the light exiting collimator lens 12 will deviate from the desired axis 24. In order to construct a transverse spatial mode transformer, such as the one described in pending U.S. patent applications Ser. No. 09/249,830, 09/248,969 and 09/249,920 all filed on Feb. 12, 1999 whose contents are incorporated by reference and which are assigned to the assignee of this application, the collimation must be sufficiently accurate. Prior art methods generally are either cost prohibitive or not accurate enough to be used in precision applications.

SUMMARY OF THE INVENTION

The present invention relates to a multi-element assembly and a method for aligning a first component and a second component inside the assembly. The multi-element assembly includes an object having spherical surface, a first component, and a second component. The object includes a first bore and a second bore. The first and second bores have longitudinal axes which intersect at a predetermined angle. In one embodiment the object has a center and the longitudinal axes of the first and second bores intersect the center. In another embodiment the first component is an optical fiber. In another embodiment the second component is a lens. In a further embodiment, the lens is a collimating lens.

The method includes the steps of providing an object having a spherical surface and generating a first bore and a second bore in the object. The first and second bores have longitudinal axes which intersect at a predetermined angle. The method also includes the steps of positioning a first component in the first bore at a first position and positioning a second component in the second bore at a second position. In one embodiment the first and second components are separated by a predetermined distance.

BRIEF DESCRIPTION OF THE DRAWINGS

The above and further advantages of this invention may be better understood by referring to the following description taken in conjunction with the accompanying drawings, in which.

DETAILED DESCRIPTION

Figure 1:
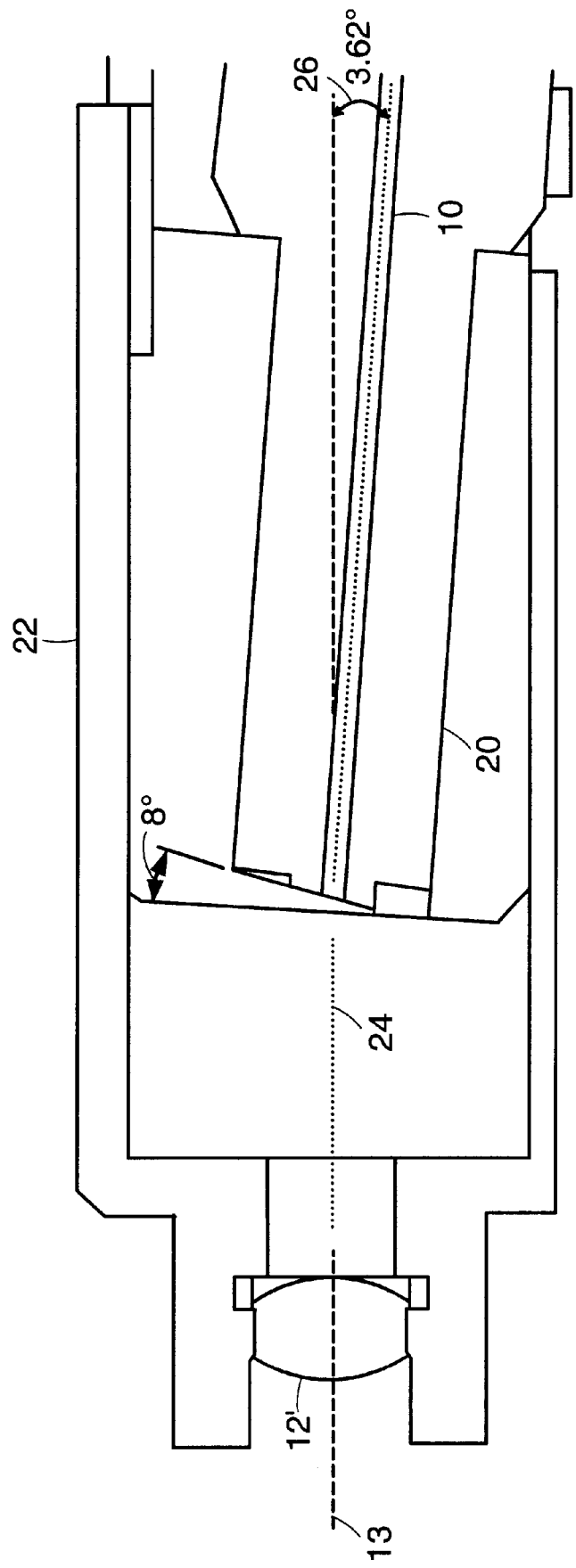
FIG. 1 illustrates a typical apparatus known to the prior art, which is used for aligning a fiber and a collimating lens.
Figure 2:
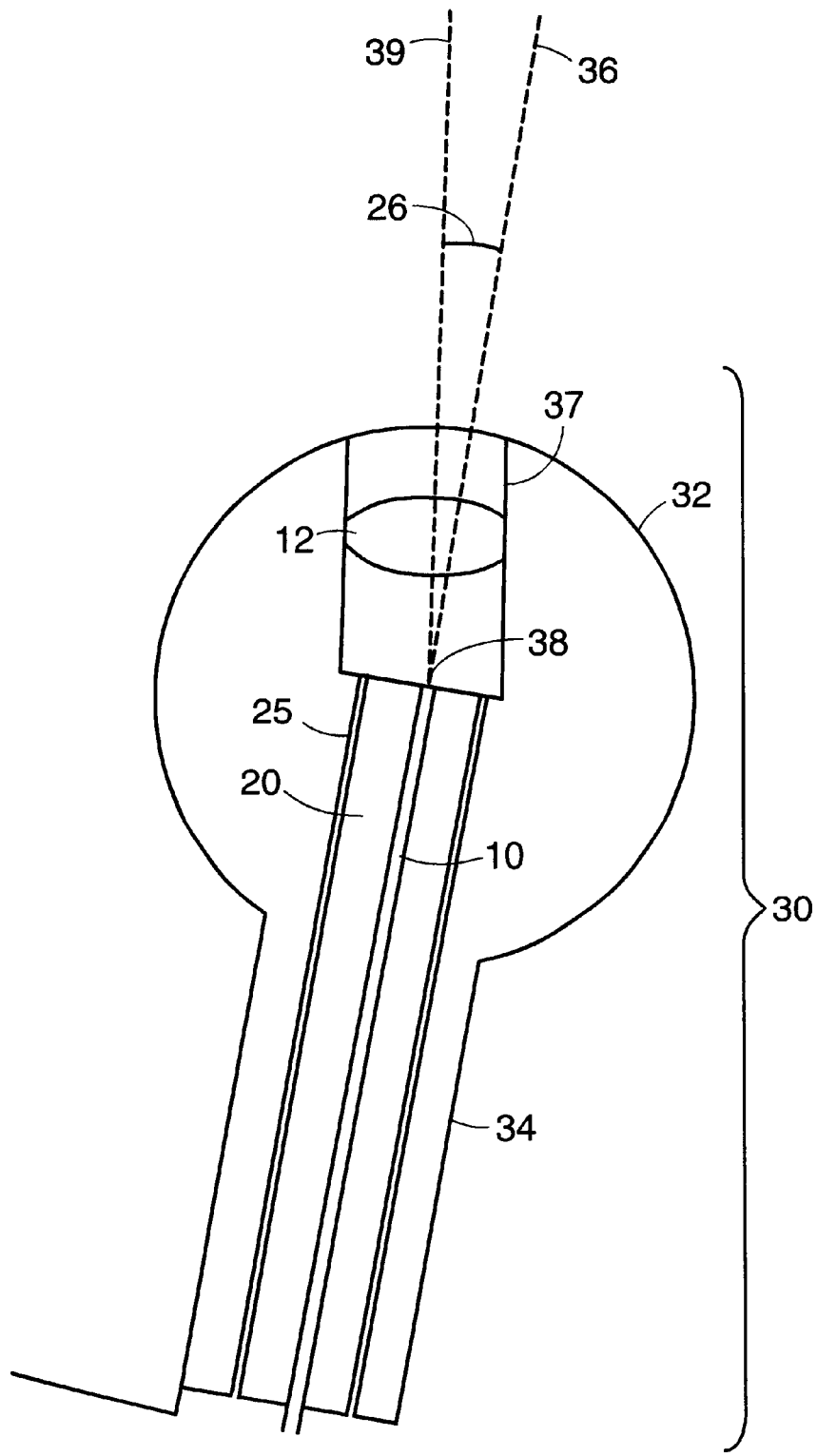
FIG. 2 illustrates a cross-sectional diagram of an embodiment of an optical collimator constructed in accordance with the present invention.

In brief overview, the present invention relates to a method for fabricating a high precision optical collimator for use in conjunction with an optical waveguide and the collimator made by that method. In one embodiment of the invention and referring to FIG. 2, a collimator housing 30 includes a portion of a sphere 32 (generally referred to as a sphere) having a protruding tube 34. In one embodiment the sphere 32 is accurately machined so that the deviation from a perfect sphere is approximately 2 μm. The tube 34 includes a first bore 25 concentric with the tube 34 and having a longitudinal axis 36. The sphere 32 includes a second bore 37 whose longitudinal axis 39 is offset from the longitudinal axis 36 of the first bore 25 by a predetermined angle 26. In one embodiment, the predetermined angle is equal to 3.62°.

The first bore 25 extends through the center 38 of the sphere 32. A first component 10, such as an optical fiber, is inserted into a ferrule 20. The first component 10 is secured into the ferrule 20 with an adhesive. This assembly (ferrule 20 and first component 10) is polished at the desired APC, which in one embodiment is 8°, and is inserted in the first bore 25. In one embodiment, the ferrule 20 is secured into the first bore 25 with an adhesive. In another embodiment the ferrule 20 is secured into the first bore 25 with a set screw. The diameter of the first bore 25 is between +5 and +10 μm greater than the nominal outer diameter of the ferrule 20. The optical fiber may be a single mode fiber, a multi-mode fiber, a high order mode fiber, or a few mode fiber.

The second bore 37, whose longitudinal axis 39 is offset by the predetermined angle 26 from the longitudinal axis 36 of the first bore 25, intersects the center 38 of the sphere 32. A second component 12, which in one embodiment is a lens 12, is inserted into the second bore 37. In one embodiment, the lens 12 is secured into the second bore 37 with an adhesive. In another embodiment, the lens 12 is secured into the second bore 37 with a locking O-ring. The lens 12 can be a collimating lens, a GRIN lens, a compound lens, or a singlet lens. The diameter of the second bore 37 is dependent upon the diameter of the lens. The lens 12 is positioned inside the second bore 37 so that the focal point of the lens 12 is positioned at the center 38 of the sphere 32.

Figure 3A:
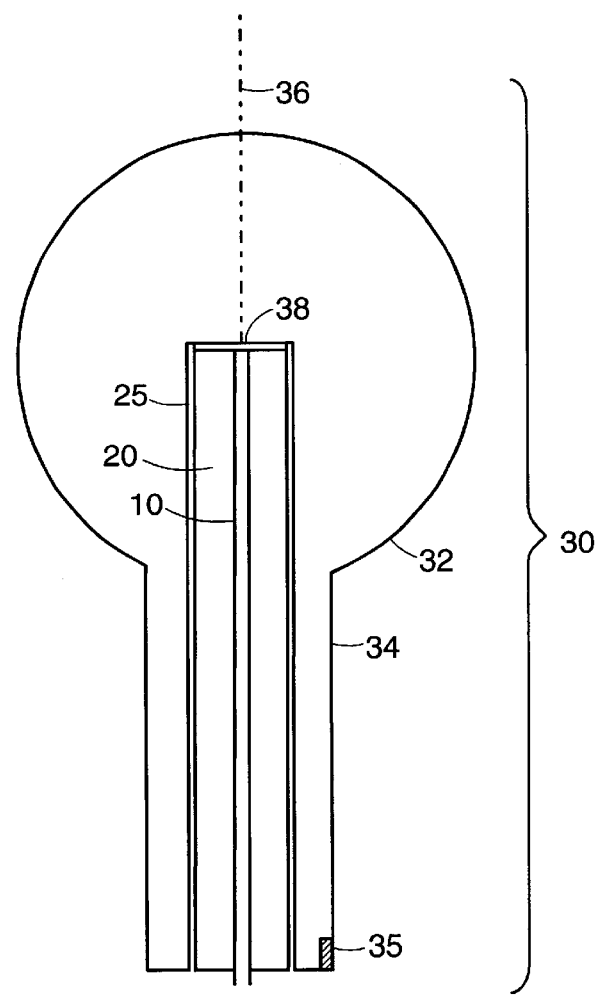
FIG. 3a illustrates a cross-sectional diagram of an embodiment of an optical collimator housing with a single bore.

In more detail, the method of fabricating the collimator housing 30 (referring to FIG. 3a) begins with the first bore 25 having a longitudinal axis 36 machined into the tube 34. Tube 34 includes an alignment notch 35 to ensure the later proper registration of the ferrule 20 with respect to the first bore 25. The first bore 25 extends through the center 38 of the sphere 32 and extends beyond the center 38 by a distance dependent on the size of the sphere 32 and the components 10, 12. Then the center 38 of the sphere 32 is found by rotating the sphere 32 on a lathe and using standard techniques known to those of ordinary skill.

Figure 3B:
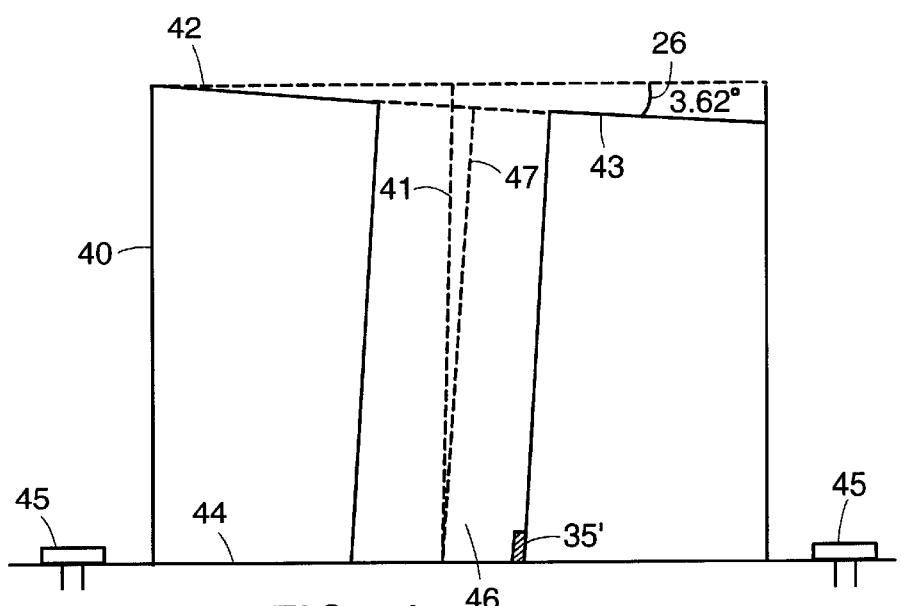
FIG. 3b illustrates an embodiment of an alignment jig constructed according to the present invention.

FIG. 3b illustrates an alignment jig 40, which is used to offset the longitudinal axis 39 of the second bore 37 in the sphere 32 by the predetermined angle 26 with respect to the longitudinal axis 36 of the first bore 25. The alignment jig 40 is constructed to include a top surface 43, a bottom surface 44, fasteners 45 and bore 46. Plane 42 is parallel to bottom surface 44 and intersects top surface 43. Top surface 43 is polished or machined to be offset with respect to plane 42 by the predetermined angle 26 of 3.62°. Next, a bore 46 is drilled perpendicular to the new top surface 43. The bore 46 has a center axis shown as dashed line 47. Line 41, which is drawn perpendicular to the bottom surface 44, is shown for comparison. Alignment extension 35' is inserted to engage the alignment notch 35 of tube 34.

Figure 4:
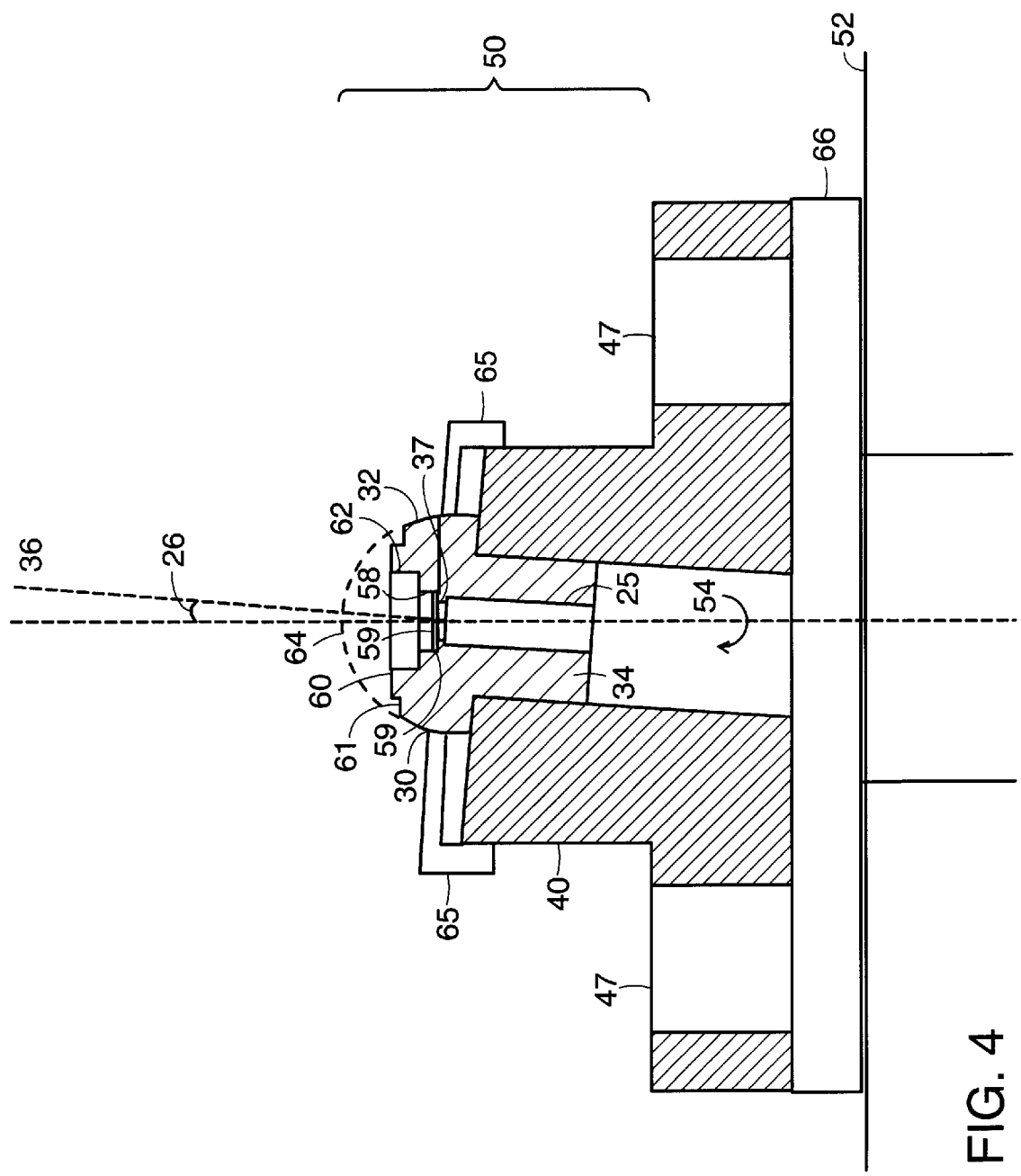
FIG. 4 illustrates an embodiment of an assembly for fabricating the collimator of the present invention using the alignment jig of FIG. 3.

Referring to FIG. 4, the tube 34 of the collimator housing 30 is inserted into the bore 46 of the alignment jig 40. The collimator housing 30 is then fastened into the jig 40 by a threaded cap 65 that secures the collimator housing 30 in place. The assembly 50 is mounted on jig 66 using the fasteners 45 (not shown) inserted through the holes 47 and jig 66 is secured in the center of the rotatable table 52. The location of jig 40 is adjusted to ensure that axis of rotation 54 of the rotatable table 52 is coincident with the center 38 of the sphere 32. The jig 40 is then secured by tightening the fasteners 45 (not shown). In an alternative embodiment (not shown) assembly 50 is directly secured to rotatable table 52. The assembly 50 is then rotated on the rotatable table 52 about the axis of rotation 54 of the table 52. The axis of rotation 54 is offset by the predetermined angle 26 from the longitudinal axis 36 of the first bore 25. Although the longitudinal axis 36 of the first bore 25 is not aligned with the axis of rotation 54 of the table 52, the center 38 (not shown) of sphere 32 can still be found as long as a sufficient portion of the surface of the sphere 32 exists. In one embodiment, the predetermined angle 26 is not greater than the maximum angle subtended by the portion of the surface of the sphere 32.

As the assembly 50 is rotated, typically measurement devices (e.g. calipers or probes) are used to contact the surface of the sphere 32 to determine the center 38 and the second bore 37 is drilled to intersect the center 38. The second bore 37 extends beyond the center 38 by a distance to accommodate the optical path of the light beam. The diameter of the second bore 37 is dependent on the clear aperture required for lens 12.

A larger bore 58 concentric with the second bore 37 is then drilled to create a seat for the lens 12 at a predetermined distance from the center 38 of the sphere 32. In one embodiment, a slightly larger bore 59 is cut to prevent breakage of the edges of the lens 12. Note that the top of the sphere 32 is shown to be a flat surface 60 and can have additional mechanical indents such as indent 61. However, in other embodiments, the sphere 32 is not machined and includes the spherical top 64. In another embodiment, a large bore 62 is drilled to allow for the propagation of the light collimated by lens 12.

Figure 5A:
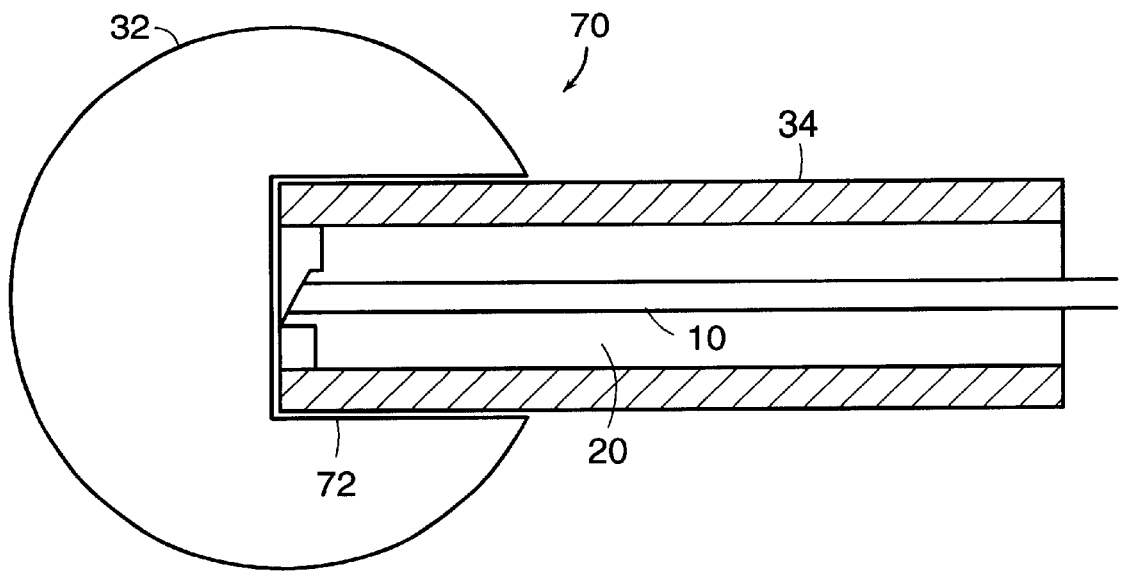
FIG. 5a illustrates another embodiment of the invention using a two-piece assembly to fabricate a collimator housing.

FIG. 5a illustrates an embodiment of the invention using a two piece assembly 70 of a sphere 32 and a tube 34. A bore 72 is drilled through the center 38 of the sphere 32 to accept the tube 34. Tube 34 is designed to hold ferrule 20.

Figure 5B:
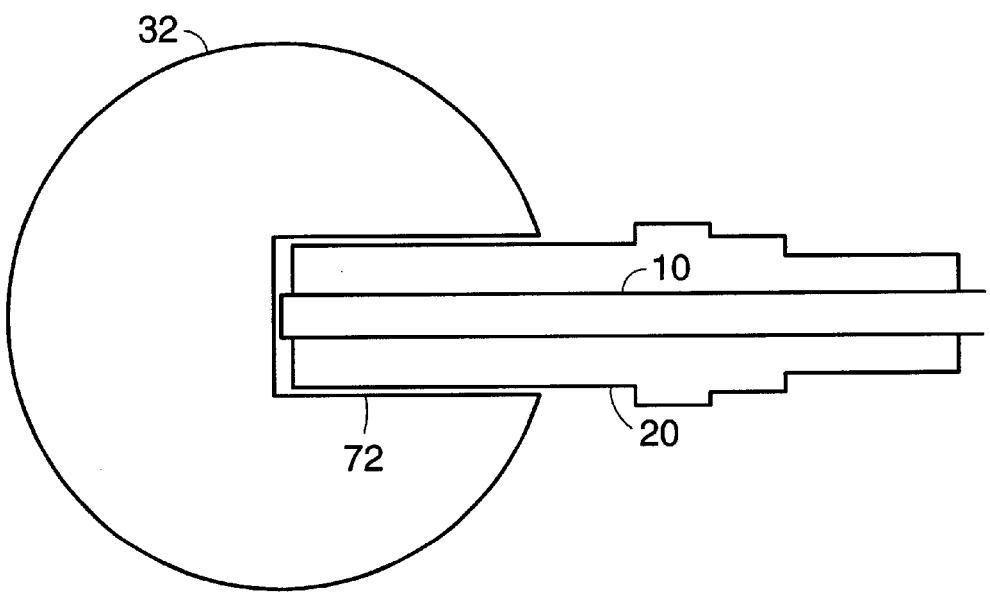
FIG. 5b illustrates another embodiment of the invention using a sphere and a ferrule.

FIG. 5b illustrates an embodiment of the invention using ferrule 20 and sphere 32. A bore 72 is precisely drilled through the center 38 of the sphere 32 to accept the ferrule 20.

Figure 6:
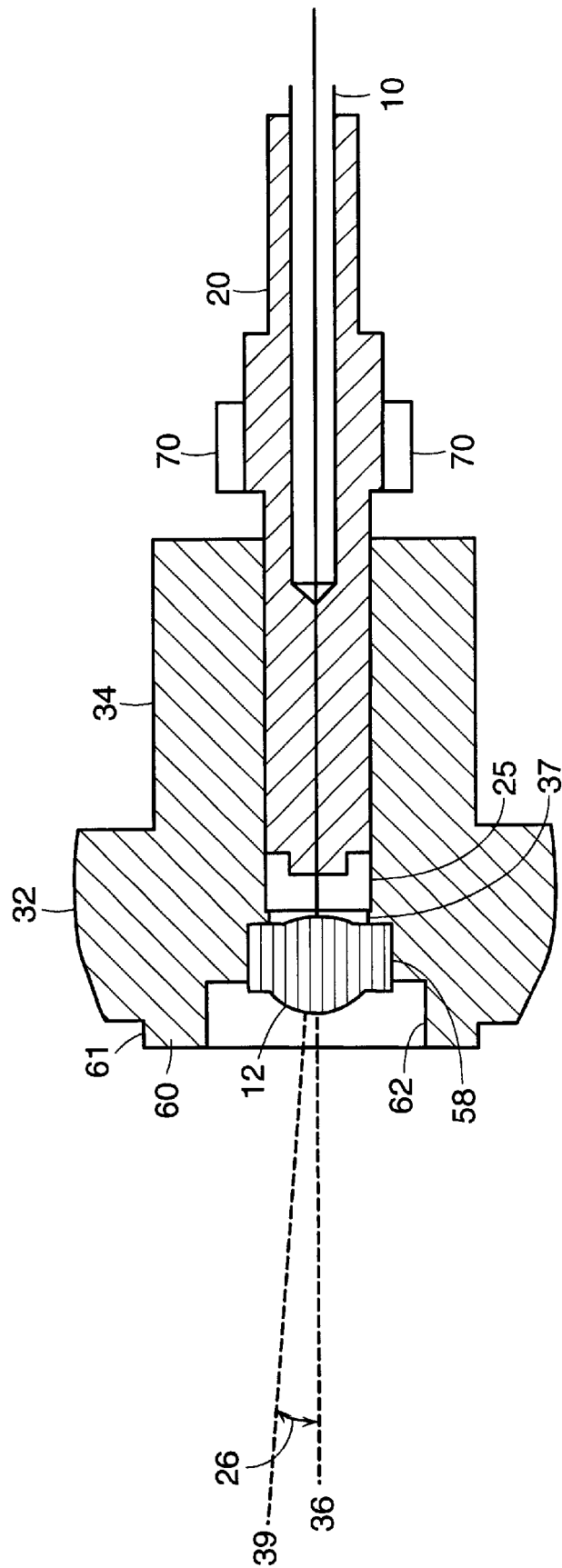
FIG. 6 illustrates a complete collimator assembly according to one embodiment of the present invention.

A complete multi-element collimator assembly is shown in FIG. 6. The diagram shows the sphere 32 with the lens 12, bore 62, bore 58, bore 37, and bore 25 as well as the ferrule 20 containing the first component 10. Lens 12 is first inserted and secured in bore 58, following which ferrule 20 containing fiber 10 is inserted into the first bore 25 to a predetermined distance from lens 12. In one embodiment the predetermined distance is the focal length of the lens 12. The position of ferrule 20 is finely adjusted to achieve precise collimation. To prevent rotation of the ferrule 20, which if allowed would affect the position of the light beam exiting from the first component 10, the ferrule 20 is secured once the final position is achieved. In one embodiment the ferrule 20 is secured inside the tube 34 using a locking screw (not shown). In another embodiment the ferrule 20 is secured using an adhesive.

Using the method and apparatus of the invention, the predetermined angle 26 of 3.62° can be precisely manufactured. In another embodiment of the invention, any desired angle between the longitudinal axes 36, 39 of the bores 25, 37 can be realized by using the method and apparatus of the invention.

It will be appreciated that the embodiments described above are merely examples of the invention and that other embodiments incorporating variations therein are considered to fall within the scope of the invention.

What is claimed is:

1. A method for enabling reliable, consistent alignment of a beam of light exiting an end of an optical fiber, with a collimating lens, wherein the optical fiber end is cut at a non-perpendicular angle to a longitudinal axis of the optical fiber, and the beam of light exits the optical fiber end at an exit angle relative to the longitudinal axis, said method comprising the steps of:

providing an object comprising a spherical surface having a center;

generating a first bore in said object, said first bore having a longitudinal axis intersecting said center;

generating a second bore in said object, said second bore having a longitudinal axis intersecting said center, said longitudinal axis of said first bore and said longitudinal axis of said second bore intersecting said center at a predetermined angle, said predetermined angle being equivalent to the exit angle and being determined by the non-perpendicular optical fiber cut angle;

positioning the end of the optical fiber in said first bore; and positioning the collimating lens in said second bore, whereby the beam of light is aligned substantially with the center of said collimating lens.

2. The method of claim 1 wherein said end of the optical fiber is located a predetermined distance from said collimating lens.

3. The method of claim 1 wherein said non-perpendicular cut angle is 8°.

4. The method of claim 1 wherein said exit angle is 3.62°.

5. The method of claim 1 further comprising adjusting the location of said fiber end with respect to said center.

6. The method of claim 1 further comprising adjusting the location of said fiber end with respect to said collimating lens.

7. The method of claim 1 wherein said first bore has a first bore diameter and said second bore has a second bore diameter, said first bore diameter being less than said second bore diameter.

8. A multi-element optical assembly comprising:

an object comprising a spherical surface defining a center, said object defining a first bore having a longitudinal axis intersecting said center and a second bore having a longitudinal axis intersecting said center, said longitudinal, axis of said first bore and said longitudinal axis of said second bore intersecting at a first predetermined angle;

an optical fiber end cut at a non-perpendicular angle to a longitudinal axis of said optical fiber positioned in said first bore, said non-perpendicular angle defining an exit angle of a beam of light relative to said longitudinal axis; and a collimating lens positioned in said second bore, said first predetermined angle being equivalent to said exit angle, and whereby said beam of light is substantially aligned with the center of said collimating lens.

9. The apparatus of claim 8 wherein said collimating lens is located a predetermined distance from said optical fiber end.

10. The apparatus of claim 8 wherein said spherical surface is spherical to within 2 μm.

11. The apparatus of claim 8 further comprising a third bore concentric with said second bore.

12. The apparatus of claim 8 wherein said non-perpendicular angle is 8°.

13. The apparatus of claim 8 wherein said exit angle is 3.62°.

14. The apparatus of claim 8 wherein said collimating lens is a gradient index lens.

15. A multi-element optical assembly comprising:

an object comprising a spherical surface defining a center, said object defining a first bore having a longitudinal axis intersecting said center and a second bore having a longitudinal axis intersecting said center, said longitudinal axis of said first bore and said longitudinal axis of said second bore intersecting at a first predetermined angle;

an optical fiber end cut at a non-perpendicular angle to a longitudinal axis of said optical fiber positioned in said first bore, said non-perpendicular angle defining an exit angle of a beam of light relative to said longitudinal axis;

a third bore concentric with said second bore, and a collimating lens positioned in said third bore, said first predetermined angle being equivalent to said exit angle, and whereby said beam of light is aligned substantially with the center of said collimating lens.

16. The apparatus of claim 15 wherein said collimating lens is located a predetermined distance from said optical fiber end.

17. The apparatus of claim 15 wherein said spherical surface is spherical to within 2 μm.

18. The apparatus of claim 15 wherein said non-perpendicular angle is 8°.

19. The apparatus of claim 15 wherein said exit angle is 3.62°.

20. The apparatus of claim 15 wherein said collimating lens is a gradient index lens.

* * * * *